United States Patent
Lin et al.

(10) Patent No.: US 9,462,242 B2
(45) Date of Patent: Oct. 4, 2016

(54) SMARTPHONE AND EXTERNAL MICRO PROJECTOR THEREOF

(71) Applicant: HUIZHOU TCL MOBILE COMMUNICATION CO., LTD., HuiZhou, Guangdong (CN)

(72) Inventors: Jinai Lin, HuiZhou (CN); Cheol Woo Park, HuiZhou (CN); Hongxia Leng, HuiZhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 76 days.

(21) Appl. No.: 14/417,084

(22) PCT Filed: Apr. 23, 2014

(86) PCT No.: PCT/CN2014/076049
§ 371 (c)(1),
(2) Date: Jan. 23, 2015

(87) PCT Pub. No.: WO2015/043171
PCT Pub. Date: Apr. 2, 2015

(65) Prior Publication Data
US 2016/0044291 A1 Feb. 11, 2016

(30) Foreign Application Priority Data
Sep. 29, 2013 (CN) .......................... 2013 1 0453581

(51) Int. Cl.
*H04N 9/31* (2006.01)
*G03B 21/00* (2006.01)
*G03B 21/14* (2006.01)
*H04M 1/02* (2006.01)
*H04M 1/725* (2006.01)

(52) U.S. Cl.
CPC ............ *H04N 9/3173* (2013.01); *G03B 21/00* (2013.01); *G03B 21/145* (2013.01); *H04M 1/0272* (2013.01); *H04M 1/72527* (2013.01)

(58) Field of Classification Search
CPC ..... G03B 21/10; G03B 21/145; H04M 1/04; H04M 1/0262; H04M 1/0274; H04M 1/72527
See application file for complete search history.

(56) References Cited

U.S. PATENT DOCUMENTS

| | | | |
|---|---|---|---|
| 8,868,939 B2 | 10/2014 | Matsuoka | |
| 2008/0164934 A1* | 7/2008 | Hankey | H01R 13/2428 327/407 |
| 2009/0128785 A1* | 5/2009 | Silverstein | G03B 21/56 353/119 |
| 2010/0004062 A1* | 1/2010 | Maharbiz | A63F 3/00643 463/36 |

FOREIGN PATENT DOCUMENTS

| | | |
|---|---|---|
| CN | 201638916 | 11/2010 |
| CN | 102217201 | 10/2011 |
| CN | 202309818 | 7/2012 |
| CN | 103166286 | 6/2013 |
| CN | 203193782 | 9/2013 |
| CN | 103475834 | 12/2013 |

* cited by examiner

*Primary Examiner* — Sultan Chowdhury
(74) *Attorney, Agent, or Firm* — Hauptman Ham, LLP

(57) ABSTRACT

An external micro projector comprises a micro projector body. A magnetic block is disposed in the micro projector body. The magnetic block is used for magnetically adhering with a magnetic adhesion device in a smartphone. A Pogo Pin connector is disposed on the micro projector body. The Pogo Pin connector is used for being electrically connected to the smartphone.

18 Claims, 3 Drawing Sheets

SMARTPHONE AND EXTERNAL MICRO PROJECTOR THEREOF

CROSS REFERENCE TO RELATED APPLICATION

This application claims the priority of Chinese Patent Application No. 201310453581.X, filed on Sep. 29, 2013 in the SIPO (State Intellectual Property Office of the P.R.C). Further, this application is the National Phase application of International Application No. PCT/CN2014/076049 filed Apr. 23, 2014, which designates the United States and was published in Chinese. The entire disclosure of each of the above applications is incorporated herein by reference.

BACKGROUND OF THE INVENTION

1. Field of the Invention

The present invention relates to a smartphone and an external micro projector, more particularly, to an external micro projector capable of being connected to a smartphone conveniently and being manipulated by a smartphone conveniently.

2. Description of the Related Art

Nowadays, the projectors on the market are too bulky to carry and are only suitable for use in a fixed place, such as a meeting room or a living room. The now existing projector phones were all in the all-in-one form when they first appeared. After the projection function is added, the phones become thicker which causes an unpleasing appearance and a cumbersome look.

It is therefore very important to provide a smartphone and an external micro projector thereof so as to resolve the problems of the prior art.

SUMMARY OF THE INVENTION

It is an objective of the present invention to provide an external micro projector to solve the above-mentioned problems. The external micro projector can be connected to a smartphone conveniently and manipulated by the smartphone conveniently.

The present invention provides a smartphone. The smartphone can be connected to an external micro projector conveniently and is manipulated conveniently.

An external micro projector comprises a micro projector body. A magnetic block is disposed in the micro projector body. The magnetic block is used for magnetically adhering with a magnetic adhesion device in a smartphone. A Pogo Pin connector is disposed on the micro projector body. The Pogo Pin connector is used for being electrically connected to the smartphone. The micro projector body comprises a case, a back cover, and a bottom cover. The bottom cover is assembled on a bottom side of the case. The back cover is assembled at a back side of the case. A projection lamp front lens of the micro projector body is located at a front side of the case, cavities respectively adapted for accommodating the magnetic block and the Pogo Pin connector are disposed on the back side of the case, holes adapted for being inserted by pins on the Pogo Pin connector are formed in the back cover. A rechargeable battery is disposed in the micro projector body. An universal serial bus port is disposed on the micro projector body. The micro projector body is connected to the smartphone through a data line such that the rechargeable battery charges the smartphone when the micro projector body is separated from the smartphone.

In one aspect of the present invention, the holes in the back cover are arranged in a row and located in middle of the back cover, a number of the magnetic blocks is two, the magnetic blocks are respectively disposed on two sides of the Pogo Pin connector, magnetic adhesion surfaces of the magnetic blocks stick to an inner side surface of the back cover after being assembled.

In another aspect of the present invention, a support surface is disposed on the back cover, the support surface contacts an edge surface of a back cover of the smartphone, the support surface is used to allow an acute angle more than 45 degrees to be formed between a screen of the smartphone and a bottom of the micro projector body when the back cover contacts with and is fixed to the smartphone.

In another aspect of the present invention, the support surface is a flat surface adapted for fitting the edge surface of the back cover of the smartphone.

In another aspect of the present invention, the support surface is a concave surface adapted for fitting the edge surface of the back cover of the smartphone.

In another aspect of the present invention, a rubber pad is disposed on a bottom surface of the bottom cover.

In another aspect of the present invention, the universal serial bus port is connected to a connecting line of a charger to provide electrical power to the micro projector body and the smartphone when the micro projector body is electrically connected to the smartphone through the Pogo Pin connector.

An external micro projector comprises a micro projector body. A magnetic block is disposed in the micro projector body. The magnetic block is used for magnetically adhering with a magnetic adhesion device in a smartphone. A Pogo Pin connector is disposed on the micro projector body. The Pogo Pin connector is used for being electrically connected to the smartphone.

In one aspect of the present invention, the micro projector body comprises a case, a back cover, and a bottom cover, the bottom cover is assembled on a bottom side of the case, the back cover is assembled at a back side of the case, a projection lamp front lens of the micro projector body is located at a front side of the case, cavities respectively adapted for accommodating the magnetic block and the Pogo Pin connector are disposed on the back side of the case, holes adapted for being inserted by pins on the Pogo Pin connector are formed in the back cover.

In another aspect of the present invention, the holes in the back cover are arranged in a row and located in middle of the back cover, a number of the magnetic blocks is two, the magnetic blocks are respectively disposed on two sides of the Pogo Pin connector, magnetic adhesion surfaces of the magnetic blocks stick to an inner side surface of the back cover after being assembled.

In another aspect of the present invention, a support surface is disposed on the back cover, the support surface contacts an edge surface of a back cover of the smartphone, the support surface is used to allow an acute angle more than 45 degrees to be formed between a screen of the smartphone and a bottom of the micro projector body when the back cover contacts with and is fixed to the smartphone.

In another aspect of the present invention, the support surface is a flat surface adapted for fitting the edge surface of the back cover of the smartphone.

In another aspect of the present invention, the support surface is a concave surface adapted for fitting the edge surface of the back cover of the smartphone.

In another aspect of the present invention, a rubber pad is disposed on a bottom surface of the bottom cover.

In another aspect of the present invention, a rechargeable battery is disposed in the micro projector body, an universal serial bus port is disposed on the micro projector body, the micro projector body is connected to the smartphone through a data line such that the rechargeable battery charges the smartphone when the micro projector body is separated from the smartphone.

In another aspect of the present invention, the universal serial bus port is connected to a connecting line of a charger to provide electrical power to the micro projector body and the smartphone when the micro projector body is electrically connected to the smartphone through the Pogo Pin connector.

In another aspect of the present invention, an angle between the screen of the smartphone and the bottom of the micro projector body is 75 degrees.

According to the present invention, a smartphone comprising a smartphone body and an external micro projector, wherein a Pogo Pin socket is disposed on a back cover of the smartphone body, a magnetic adhesion device is disposed in an inner side of the back cover, and the external micro projector comprises a micro projector body, and wherein a magnetic block is disposed in the micro projector body, the magnetic block is used for magnetically adhering with a magnetic adhesion device in a smartphone, a Pogo Pin connector is disposed on the micro projector body, the Pogo Pin connector is used for being electrically connected to the smartphone.

According to the present invention smartphone and external micro projector thereof, the external micro projector can be fixed to the smartphone structurally by the magnet because the magnet and the Pogo Pin connector are adopted. There will not be any impact on the appearance of smartphone. The Pogo Pin connector can be used to achieve the electrical connection between the smartphone and the external micro projector conveniently without any plugging action. The present invention has the advantages of convenient connection and convenient operation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

In order to illustrate the technique and effects of the present invention, a detailed description will be disclosed by the following disclosure in conjunction with figures. It is noted that the same components are labeled by the same number.

Figure 1:
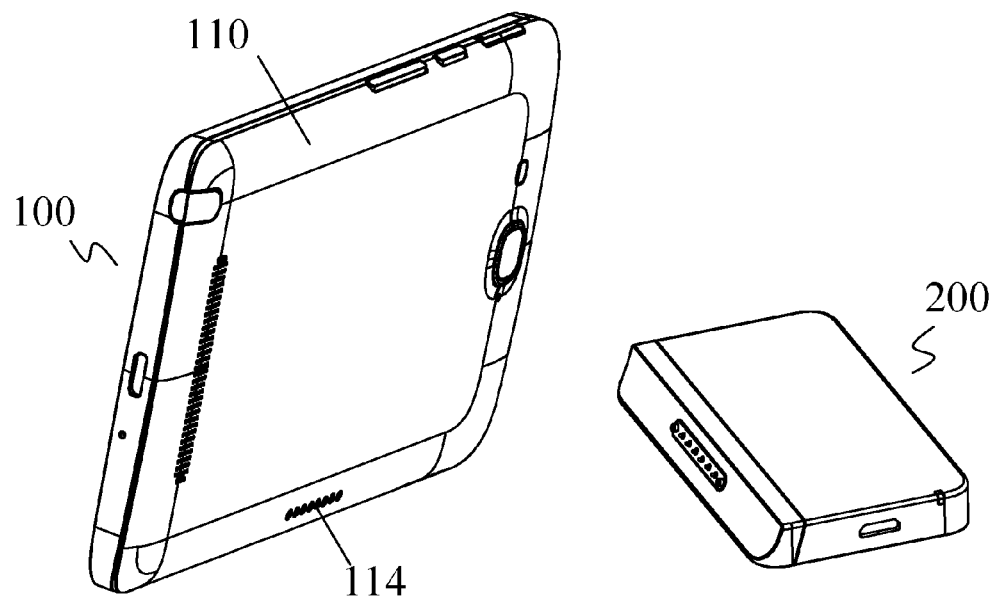
FIG. 1 is an exploded view of a smartphone and an external micro projector thereof according to the present invention.

Refer to FIG. 1, FIG. 1 is an exploded view of a smartphone and an external micro projector thereof according to the present invention. A micro projector body 200 is external to a smartphone 100. That is, the micro projector body serves as an auxiliary accessory of the smartphone 100. When a projection function is required at any time and there is no traditional projector on site, the micro projector body 200 is combined with the smartphone 100 to achieve on-site projection function. The benefits of doing so are as follows. First, not only is a thickness of the smartphone 100 decreased, but a weight of the smartphone 100 is also reduced. Second, the micro projector body 200 can further act as a mobile power supply to provide the smartphone 100 with enduring electric power under special circumstances.

However, the improvements of the external micro projector of the present invention are not limited in this regard. The reason lies in that whether the connection of the smartphone 100 to the micro projector body 200 is convenient when the smartphone 100 is utilized to perform projection function and whether users are allowed to operate the smartphone 100 conveniently during the projection process are both practical issues need to be solved.

In the smartphone 100 shown in FIG. 1, a Pogo Pin socket 114 having pins arranged in a row is disposed at an edge of a back cover 110 on the back of the smartphone 100. Pogo pin is a precise connector applied to electronic products, such as a cell phone. Pogo pin is extensively applied to semiconductor equipment to achieve the connection function.

The smartphone 100 can be charged and discharged at any time by utilizing the Pogo Pin connectors on a protective cover of a cell phone screen (not shown in the figure) having a wireless charging function. A magnetic adhesion device (not shown in the figure) is further disposed on an inner side of the back cover 110 of the smartphone 100 so as to adhere a landing edge of the protective cover of the cell phone screen to the back cover 110 of the smartphone 100 by employing magnetic adhesion principle.

As such, it is contemplated whether the protective cover of the cell phone screen can be conveniently removed when the projection function of the smartphone 100 is required. In addition, the existing magnetic adhesion device and the Pogo Pin socket 114 on the smartphone 100 can be utilized to fix and connect the micro projector body 200 so as to resolve the problems of inconvenient connection and inconvenient operation.

The so-called Pogo Pin connector is a connector with a spring probe. Since the internal structure of the Pogo Pin connector is well known to those skilled in the art, a description in this regard is not provided.

Figure 2:
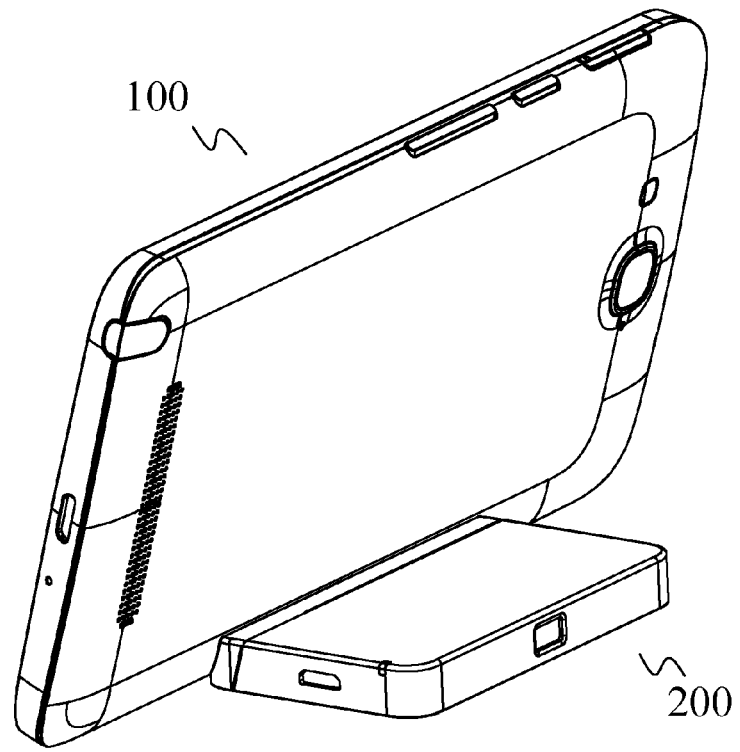
FIG. 2 is a state diagram of an external micro projector when the external micro projector is in use according to a first embodiment of the present invention.

FIG. 2 is a state diagram of an external micro projector when the external micro projector is in use according to a first embodiment of the present invention. The micro projector body 200 lies flat when it projects. A screen of the smartphone 100 faces up_traversely with its back leaning on a back side of the micro projector body 200 at an angle. In this manner, users are allowed to perform operations on the screen of the smartphone 100 much more conveniently.

Figure 3:
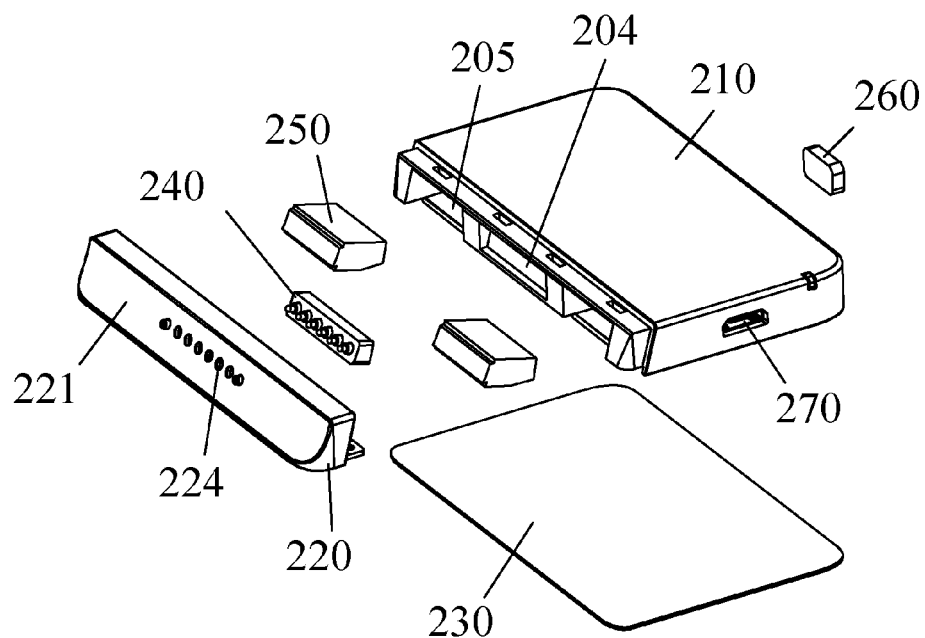
FIG. 3 is an exploded view of a micro projector body according to the present invention.

Refer to FIG. 3, FIG. 3 is an exploded view of a micro projector body according to the present invention. In a preferred embodiment of the present external micro projector, the micro projector body comprises a case 210, a back cover 220, a bottom cover 230, a Pogo Pin connector 240, and magnetic blocks 250. The bottom cover 230 is assembled to a bottom side of the case 210. The back cover 220 is assembled on a back side of the case 210. Projection lamp front lens 260 of the micro projector body 200 is located at a front side of the case 210. Cavities 204 and 205 respectively adapted for accommodating the Pogo Pin connector 240 and the magnetic blocks 250 are disposed on the back side of the case 210. Holes 224 adapted for being inserted by pins on the Pogo Pin connector 240 are formed in the back cover 220.

In greater detail, the Pogo Pin connector 240 may be a single row Pogo Pin connector that is the same as the above-mentioned Pogo Pin connector on the protective cover of the cell phone screen. The holes 224 in the back cover 220 also arrange in a row and located in middle of the back cover 220. A number of the magnetic blocks 250 is two. The magnetic blocks 250 are respectively disposed on two sides of the Pogo Pin connector 240. Magnetic adhesion surfaces of the magnetic blocks 250 stick to an inner side surface of the back cover 220 after being assembled to enhance the magnetic adhesion force with a magnetic adhesion device in the smartphone.

Preferably, a support surface 221 contacting an edge surface of the back cover 110 of the smartphone 100 is disposed on the back cover 220. The support surface 221 is used to allow an acute angle more than 45 degrees to be formed between the screen of the smartphone 100 and a bottom of the micro projector body 200 when the back cover 220 contacts with and is fixed to the smartphone 100, as shown in FIG. 1. For example, it is 75 degrees at which users should operate the screen of the smartphone 100 most comfortably.

Furthermore, the support surface 221 may be a flat surface or a concave surface adapted for fitting the edge surface of the back cover 110 of the smartphone 100. Since the edge surface of the back cover 110 of the smartphone 100 in FIG. 1 is a concave curved surface, the support surface 221 on the back cover 220 being a convex curved surface is shown in FIG. 3.

Preferably, a rubber layer or a rubber pad (not shown in the figure) may be disposed on a bottom surface of the bottom cover 230 to increase the static friction force of the bottom of the micro projector body 200 so as to improve the support stability of the smartphone 100.

Furthermore, as mentioned previously, the micro projector body 200 can further act as a mobile power supply to provide the smartphone 100 with enduring electric power under special circumstances. Under such circumstances, a rechargeable battery (not shown in the figure) is disposed in the micro projector body 200. A universal serial bus (USB) port 270 may be disposed on a side surface of the micro projector body 200.

Figure 4:
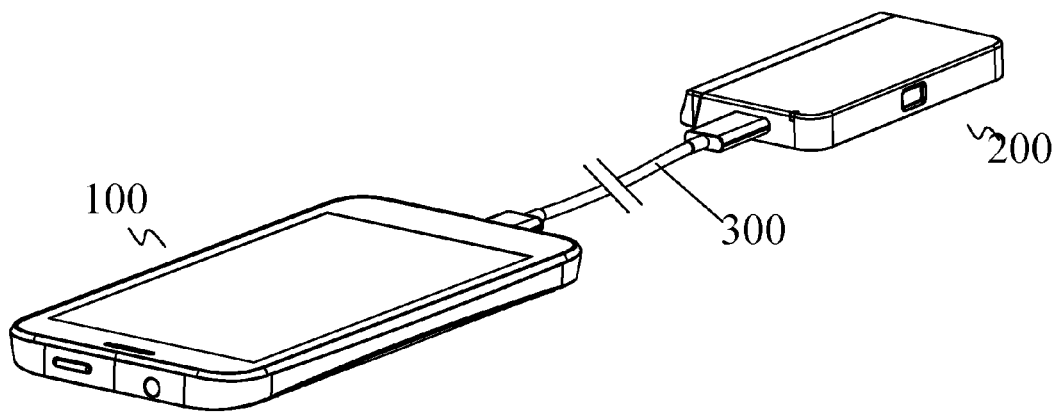
FIG. 4 is a state diagram of an external micro projector when the external micro projector is in use according to a second embodiment of the present invention.

Refer to FIG. 4, FIG. 4 is a state diagram of an external micro projector when the external micro projector is in use according to a second embodiment of the present invention. When the micro projector body 200 is separated from the smartphone 100, a data line 300 may be connected to the smartphone 100 through the USB port 270 such that the rechargeable battery in the micro projector body 200 charges the smartphone 100 or provides enduring electric power to the smartphone 100.

Figure 5:
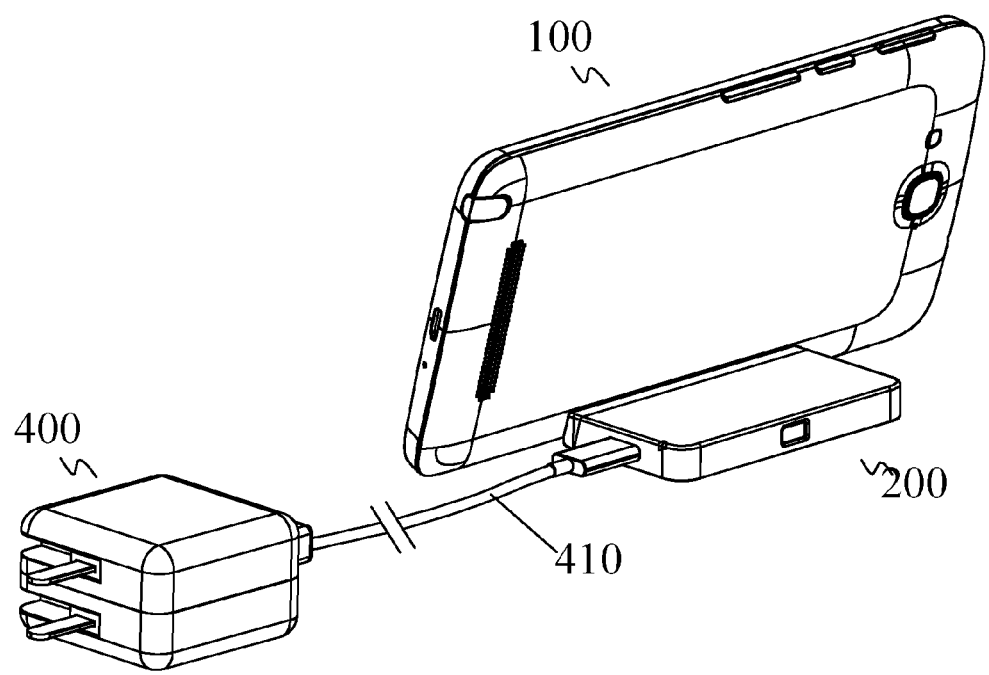
FIG. 5 is a state diagram of an external micro projector when the external micro projector is in use according to a third embodiment of the present invention.

Refer to FIG. 5, FIG. 5 is a state diagram of an external micro projector when the external micro projector is in use according to a third embodiment of the present invention. Under the circumstances that the micro projector body 200 is electrically connected to the smartphone 100 through the Pogo Pin connector, the USB port 270 can further be connected to a connecting line 410 of a charger 400 so as to provide electrical power to the micro projector body 200 and the smartphone 100 comprising charging the micro projector body 200 and the smartphone 100 and providing enduring electric power for projection for a long time.

The present invention further provides a smartphone capable of being connected conveniently and operated conveniently based on the above-mentioned external micro projector. The smartphone comprises a smartphone body and an external micro projector. A Pogo Pin socket is disposed on a back cover of the smartphone body. A magnetic adhesion device is disposed in an inner side of the back cover. The magnetic adhesion device and a magnetic block disposed in a micro projector body are magnetically adhered. A Pogo Pin connector is disposed on the micro projector body. The Pogo Pin connector matches and is combined with the Pogo Pin socket. The Pogo Pin connector is used for electrically connecting the smartphone. The external micro projector may be the external micro projector of any of the above-mentioned embodiments.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An external micro projector comprising a micro projector body, a magnetic block being disposed in the micro projector body, the magnetic block being used for magnetically adhering with a magnetic adhesion device in a smartphone, a Pogo Pin connector being disposed on the micro projector body, the Pogo Pin connector being used for being electrically connected to the smartphone, wherein the micro projector body comprises a case, a back cover, and a bottom cover, the bottom cover is assembled on a bottom side of the case, the back cover is assembled at a back side of the case, a projection lamp front lens of the micro projector body is located at a front side of the case, cavities respectively adapted for accommodating the magnetic block and the Pogo Pin connector are disposed on the back side of the case, holes adapted for being inserted by pins on the Pogo Pin connector are formed in the back cover, and wherein a rechargeable battery is disposed in the micro projector body, an universal serial bus port is disposed on the micro projector body, the micro projector body is connected to the smartphone through a data line such that the rechargeable battery charges the smartphone when the micro projector body is separated from the smartphone.

2. The external micro projector as claimed in claim 1, wherein the holes in the back cover are arranged in a row and located in middle of the back cover, a number of the magnetic blocks is two, the magnetic blocks are respectively disposed on two sides of the Pogo Pin connector, magnetic adhesion surfaces of the magnetic blocks stick to an inner side surface of the back cover after being assembled.

3. The external micro projector as claimed in claim 1, wherein a support surface is disposed on the back cover, the support surface contacts an edge surface of a back cover of the smartphone, the support surface is used to allow an acute angle more than 45 degrees to be formed between a screen of the smartphone and a bottom of the micro projector body when the back cover contacts with and is fixed to the back cover of the smartphone.

4. The external micro projector as claimed in claim 3, wherein the support surface is a flat surface adapted for fitting the edge surface of the back cover of the smartphone.

5. The external micro projector as claimed in claim 3, wherein the support surface is a concave surface adapted for fitting the edge surface of the back cover of the smartphone.

6. The external micro projector as claimed in claim 1, wherein a rubber pad is disposed on a bottom surface of the bottom cover.

7. The external micro projector as claimed in claim 1, wherein the universal serial bus port is connected to a connecting line of a charger to provide electrical power to the micro projector body and the smartphone when the micro projector body is electrically connected to the smartphone through the Pogo Pin connector.

8. An external micro projector comprising a micro projector body, a magnetic block being disposed in the micro projector body, the magnetic block being used for magnetically adhering with a magnetic adhesion device in a smartphone, a Pogo Pin connector being disposed on the micro projector body, the Pogo Pin connector being used for being electrically connected to the smartphone.

9. The external micro projector as claimed in claim 8, wherein the micro projector body comprises a case, a back cover, and a bottom cover, the bottom cover is assembled on a bottom side of the case, the back cover is assembled at a back side of the case, a projection lamp front lens of the micro projector body is located at a front side of the case, cavities respectively adapted for accommodating the magnetic block and the Pogo Pin connector are disposed on the back side of the case, holes adapted for being inserted by pins on the Pogo Pin connector are formed in the back cover.

10. The external micro projector as claimed in claim 9, wherein the holes in the back cover are arranged in a row and located in middle of the back cover, a number of the magnetic blocks is two, the magnetic blocks are respectively disposed on two sides of the Pogo Pin connector, magnetic adhesion surfaces of the magnetic blocks stick to an inner side surface of the back cover after being assembled.

11. The external micro projector as claimed in claim 9, wherein a support surface is disposed on the back cover, the support surface contacts an edge surface of a back cover of the smartphone, the support surface is used to allow an acute angle more than 45 degrees to be formed between a screen of the smartphone and a bottom of the micro projector body when the back cover contacts with and is fixed to the back cover of the smartphone.

12. The external micro projector as claimed in claim 11, wherein the support surface is a flat surface adapted for fitting the edge surface of the back cover of the smartphone.

13. The external micro projector as claimed in claim 11, wherein the support surface is a concave surface adapted for fitting the edge surface of the back cover of the smartphone.

14. The external micro projector as claimed in claim 9, wherein a rubber pad is disposed on a bottom surface of the bottom cover.

15. The external micro projector as claimed in claim 8, wherein a rechargeable battery is disposed in the micro projector body, an universal serial bus port is disposed on the micro projector body, the micro projector body is connected to the smartphone through a data line such that the rechargeable battery charges the smartphone when the micro projector body is separated from the smartphone.

16. The external micro projector as claimed in claim 15, wherein the universal serial bus port is connected to a connecting line of a charger to provide electrical power to the micro projector body and the smartphone when the micro projector body is electrically connected to the smartphone through the Pogo Pin connector.

17. The external micro projector as claimed in claim 11, wherein an angle between the screen of the smartphone and the bottom of the micro projector body is 75 degrees.

18. A smartphone comprising a smartphone body and an external micro projector, wherein a Pogo Pin socket is disposed on a back cover of the smartphone body, a magnetic adhesion device is disposed in an inner side of the back cover, and the external micro projector comprises a micro projector body, and wherein a magnetic block is disposed in the micro projector body, the magnetic block is used for magnetically adhering with a magnetic adhesion device in a smartphone, a Pogo Pin connector is disposed on the micro projector body, the Pogo Pin connector is used for being electrically connected to the smartphone.

* * * * *